(12) United States Patent
Yanagisawa et al.

(10) Patent No.: US 8,007,113 B2
(45) Date of Patent: Aug. 30, 2011

(54) PROJECTOR

(75) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 431 days.

(21) Appl. No.: 12/323,085

(22) Filed: Nov. 25, 2008

(65) Prior Publication Data

US 2009/0141249 A1  Jun. 4, 2009

(30) Foreign Application Priority Data

Nov. 29, 2007 (JP) ................................. 2007-308976

(51) Int. Cl.
 *G03B 21/16* (2006.01)
(52) U.S. Cl. ........................................... 353/52; 353/61
(58) Field of Classification Search ............... 353/52–61
 See application file for complete search history.

(56) References Cited

U.S. PATENT DOCUMENTS

| | | | | |
|---|---|---|---|---|
| 7,014,322 B2 * | 3/2006 | Okoshi | ........................ | 353/61 |
| 7,021,768 B2 * | 4/2006 | Fuse et al. | ........................ | 353/61 |
| 7,144,118 B2 * | 12/2006 | Hsu et al. | ........................ | 353/61 |
| 7,192,143 B2 * | 3/2007 | Fujimori et al. | ........................ | 353/54 |
| 7,258,447 B2 * | 8/2007 | Kim | ........................ | 353/61 |
| 7,393,109 B2 * | 7/2008 | Arboix | ........................ | 353/57 |
| 7,556,383 B2 * | 7/2009 | Utsunomiya | ........................ | 353/61 |
| 7,841,721 B2 * | 11/2010 | Momose et al. | ........................ | 353/54 |
| 2005/0185146 A1 * | 8/2005 | Fujimori et al. | ........................ | 353/61 |
| 2005/0264766 A1 * | 12/2005 | Morimoto et al. | ........................ | 353/61 |
| 2007/0195280 A1 * | 8/2007 | Chen et al. | ........................ | 353/58 |
| 2009/0141249 A1 * | 6/2009 | Yanagisawa et al. | ........................ | 353/61 |

FOREIGN PATENT DOCUMENTS

| | | |
|---|---|---|
| JP | 2000-228754 A | 8/2000 |
| JP | 2000-269674 A | 9/2000 |
| JP | 2000-298311 A | 10/2000 |
| JP | 3212818 B | 7/2001 |
| JP | 2003-270720 A | 9/2003 |
| JP | 2003-337380 A | 11/2003 |
| JP | 3608428 B | 10/2004 |
| JP | 3638256 B | 1/2005 |
| JP | 2005-121712 A | 5/2005 |
| JP | 2006-80044 A | 3/2006 |
| JP | 2006-215118 A | 8/2006 |
| JP | 2006-330147 A | 12/2006 |
| JP | 2006-343498 A | 12/2006 |
| JP | 2006-350237 A | 12/2006 |
| JP | 2007-65507 A | 3/2007 |
| JP | 2007-65623 A | 3/2007 |
| JP | 2007-334042 A | 12/2007 |
| JP | 2007-334043 A | 12/2007 |

* cited by examiner

*Primary Examiner* — John Lee
(74) *Attorney, Agent, or Firm* — AdvantEdge Law Group, LLC

(57) ABSTRACT

A projector includes: an optical component disposed inside a closed structure having air flow path through which air flows; and a circulating fan which circulates air. The closed structure includes: an optical component housing which accommodates the optical component; a duct which introduces air into the optical component housing, and introduces the air having flowed to the outside from the inside of the optical component housing again toward the inside of the optical component housing; and a plurality of heat exchangers each of which has a heat receiving side heat transfer member which faces the inside of the closed structure, and a heat releasing side heat transfer member which faces the outside of the closed structure. The plural heat exchangers are disposed in the air flow direction along the air flow path through which air flows to the outside from the inside of the optical component housing.

6 Claims, 14 Drawing Sheets

PROJECTOR

BACKGROUND

1. Technical Field

The present invention relates to a projector.

2. Related Art

Currently, such a projector is known which includes a light source device, a light modulation device for modulating light emitted from a light source device according to image information to form image light, and a projection system for enlarging and projecting the image light.

When dust, soot or the like adheres to the surface of the light modulation device of the projector, the quality of the projected image deteriorates. Moreover, the light modulation device such as liquid crystal panel does not have sufficient heat resistance in general. Thus, the light modulation device may be deteriorated by heat generated when light emitted from the light source device is applied thereto.

For overcoming these drawbacks, such a structure has been proposed which disposes the light modulation device within a closed unit and releases heat of air existing inside the closed unit to the outside by using a thermoelectric conversion element such as Peltier element while circulating the air inside the closed unit by a circulating fan so as to secure stable image quality of the projection image and efficiently cool the light modulation device (for example, see JP-A-2000-298311).

According to the structure disclosed in JP-A-2000-298311, the component (thermoelectric converting element) for cooling the air inside the closed unit is formed by only one part. Thus, when the amount of heat generated from optical components contained in the closed unit is large, for example, it is difficult to efficiently cool the air inside the closed unit. Thus, the optical components such as the light modulation device are difficult to be efficiently cooled.

Under these circumstances, therefore, there is a demand for development of a technology which can secure stable quality of a projection image for a long period, and efficiently cool the optical components such as light modulation device.

SUMMARY

It is an advantage of some aspects of the invention to provide a projector capable of securing stable quality of a projection image, and efficiently cooling optical components.

A projector according to an aspect of the invention includes: an optical component disposed inside a closed structure having an annular air flow path through which air flows; and a circulating fan which circulates air in the annular air flow path. The closed structure includes: an optical component housing which accommodates the optical component and has an inlet port through which air flows to the inside and an outlet port through which air flows to the outside; a duct which introduces air into the optical component housing via the inlet port, and introduces the air having flowed to the outside from the inside of the optical component housing via the outlet port again toward the inside of the optical component housing via the inlet port; and a plurality of heat exchangers each of which has a heat receiving side heat transfer member which faces the inside of the closed structure and receives heat from air inside the closed structure, and a heat releasing side heat transfer member which faces the outside of the closed structure and connects with the heat receiving side heat transfer member such that heat is transferable to release the heat of the heat receiving side heat transfer member to the outside of the closed structure. The plural heat exchangers are disposed in the air flow direction along the air flow path through which air flows to the outside from the inside of the optical component housing via the outlet port and again to the inlet port.

According to this structure, the optical component such as light modulation device is accommodated within the optical component housing constituting the closed structure. Thus, adhesion of dust, soot or the like to the optical component can be prevented, and stable quality of images projected by the projector can be secured for a long period.

Moreover, heat of air inside the closed structure is received by the heat receiving side heat transfer member and released to the outside of the closed structure by the heat releasing side heat transfer member of the plural heat exchanger constituting the closed structure at various positions within the flow path. Thus, even when the amount of heat generated from the optical component inside the closed structure is large, for example, the air inside the closed structure can be effectively cooled. As a result, the optical component can be efficiently cooled.

Furthermore, the plural heat exchangers are disposed in the air flow direction. Thus, air flowing through the flow path can be cooled step by step in the order from the heat exchanger positioned upstream on the flow path. Accordingly, air having lower temperature can be supplied to the optical component accommodated in the optical component housing, and the optical component can be thus cooled with higher efficiency.

It is preferable that the plural heat exchangers are disposed close to one another.

According to this structure, the plural heat exchangers are disposed close to one another. Thus, temperature increase of air between the respective heat exchangers can be prevented, and the temperature of air can be lowered step by step when the air flows through the respective heat exchangers, compared with the case where the plural heat exchangers are disposed away from each other, for example.

It is preferable that the second and further subsequent heat exchanger disposed on the upstream side of the flow path on which the plural heat exchangers are provided are interposed between the heat receiving side heat transfer member and the heat releasing side heat transfer member. In this case, it is preferable that a thermoelectric conversion element is provided which has a heat absorbing surface connected with the heat receiving side heat transfer member such that heat is transferable and a heat releasing surface connected with the heat releasing side heat transfer member such that heat is transferable.

Air warmed by the optical component initially flows to the first heat exchanger positioned first (hereinafter referred to as first heat exchanger) on the upstream side of the flow path on which the plural heat exchangers are disposed. That is, high-temperature air flows toward the first heat exchanger. When the temperature difference between the outside temperature (atmospheric temperature) outside the closed structure and the inside temperature within the closed structure is large, heat transmission characteristics of the heat receiving side heat transfer member and the heat releasing side heat transfer member become preferable. Thus, the efficiency of the structure not including the thermoelectric conversion element for absorbing heat from air inside the closed structure is substantially equivalent to that of the structure including the thermoelectric conversion element.

According to this structure, the first heat exchanger does not have the thermoelectric conversion element. Thus, heat can be absorbed from the air inside the closed structure with the same efficiency as that of the structure having the thermoelectric conversion element by using the first heat exchanger.

In this case, elimination of the thermoelectric conversion element contributes to cost reduction and power saving of the projector.

Moreover, the temperature of air flowing through the first heat exchanger lowers. Thus, air having small temperature difference from the outside temperature flows toward the heat exchanger other than the first heat exchanger. When the temperature difference is small as in this case, the efficiency of the heat exchanger including the thermoelectric conversion element for absorbing heat from air inside the closed structure is higher than that of the heat exchanger not including the thermoelectric conversion element.

According to this structure, the heat exchanger other than the first heat exchanger has the thermoelectric conversion element. Thus, the temperature of the air cooled by the first heat exchanger can be further decreased by the other heat exchanger.

It is preferable to further include: a control device which supplies power to the thermoelectric conversion element and controls the operation of the thermoelectric conversion element; and an inside temperature detecting unit which detects inside temperature of the closed structure. In this case, it is preferable that the control device stops power supply to the thermoelectric conversion element when the inside temperature detected by the inside temperature detecting unit is a predetermined first set temperature or lower.

According to this structure, the control device stops power supply to the thermoelectric conversion element when the inside temperature of the closed structure is low (for example, lower than a target temperature of the optical component), that is, when temperature of the air inside the closed structure need not be decreased. Thus, power saving of the projector can be achieved.

It is preferable to further include: a control device which supplies power to the thermoelectric conversion element and controls the operation of the thermoelectric conversion element; and an outside temperature detecting unit which detects outside temperature of the closed structure. In this case, it is preferable that the control device stops power supply to the thermoelectric conversion element when the outside temperature detected by the outside temperature detecting unit is a predetermined second set temperature or lower.

According to this structure, when the temperature difference between the outside temperature which is low and the inside temperature of the closed structure is large, the control device stops power supply to the thermoelectric conversion element. As described above, when the temperature difference between the outside temperature and the inside temperature is large, the efficiency of the structure not including the thermoelectric conversion element for absorbing heat from the air inside the closed structure is substantially equivalent to that of the structure including the thermoelectric conversion element. That is, in the case discussed above, the efficiency of absorbing heat from the air inside the closed structure becomes substantially the same even when power supply to the thermoelectric conversion element is stopped to provide the structure not including the thermoelectric conversion element in appearance. Thus, the air inside the closed structure is appropriately cooled, and also power saving of the projector is achieved.

It is preferable that the surface areas of the heat receiving side heat transfer member and the heat releasing side heat transfer member of the first heat exchanger disposed on the upstream side of the flow path on which the plural heat exchangers are disposed are larger than those of the other heat exchangers.

According to this structure, the surface areas of the heat receiving side heat transfer member and the heat releasing side heat transfer member of the first heat exchanger are larger than those of the other heat exchanger. Thus, high-temperature air warmed by the optical component initially flows to the first heat exchanger. Thus, heat can be effectively absorbed from the high-temperature air, and air flowing through the flow path can be efficiently cooled step by step by the first heat exchanger.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

Structure of External Appearance

Figure 1:
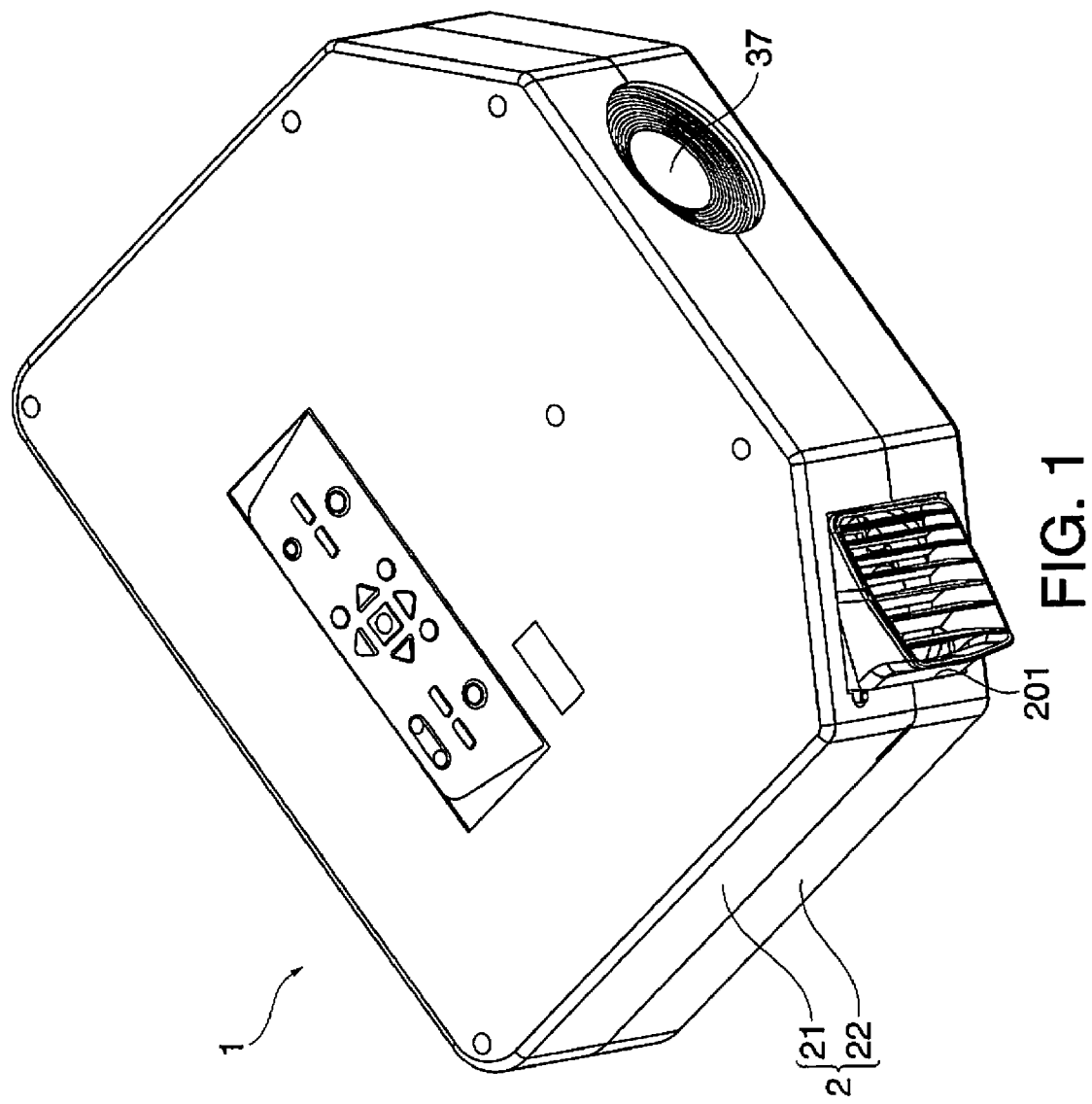
FIG. 1 is a perspective view illustrating an external appearance of a projector according to a first embodiment.

FIG. 1 is a perspective view illustrating an external appearance of a projector 1 in this embodiment. More specifically, FIG. 1 is a perspective view of the projector 1 as viewed from the upper front.

In the following description, it is assumed that the left direction in the figure corresponds to the left direction as viewed from the front of the projector 1, and that the right direction in the figure corresponds to the right direction as viewed from the front of the projector 1.

The projector 1 forms image light by modulating light emitted from a light source according to image information, and enlarges and projects the formed image light on a screen (not shown). The projector 1 has an external housing 2 constituting the external casing.

The external housing 2 is made of synthetic resin, and accommodates the main body of the projector 1. As illustrated in FIG. 1, the external housing 2 includes an upper case 21 which covers an upper part, a part of the front surface, a part of the side surface, and a part of the back surface of the projector main body, and a lower case 22 which covers the lower part, a part of the front surface, a part of the side surface, and a part of the back surface of the projector main body.

Internal Structure

Figure 2:
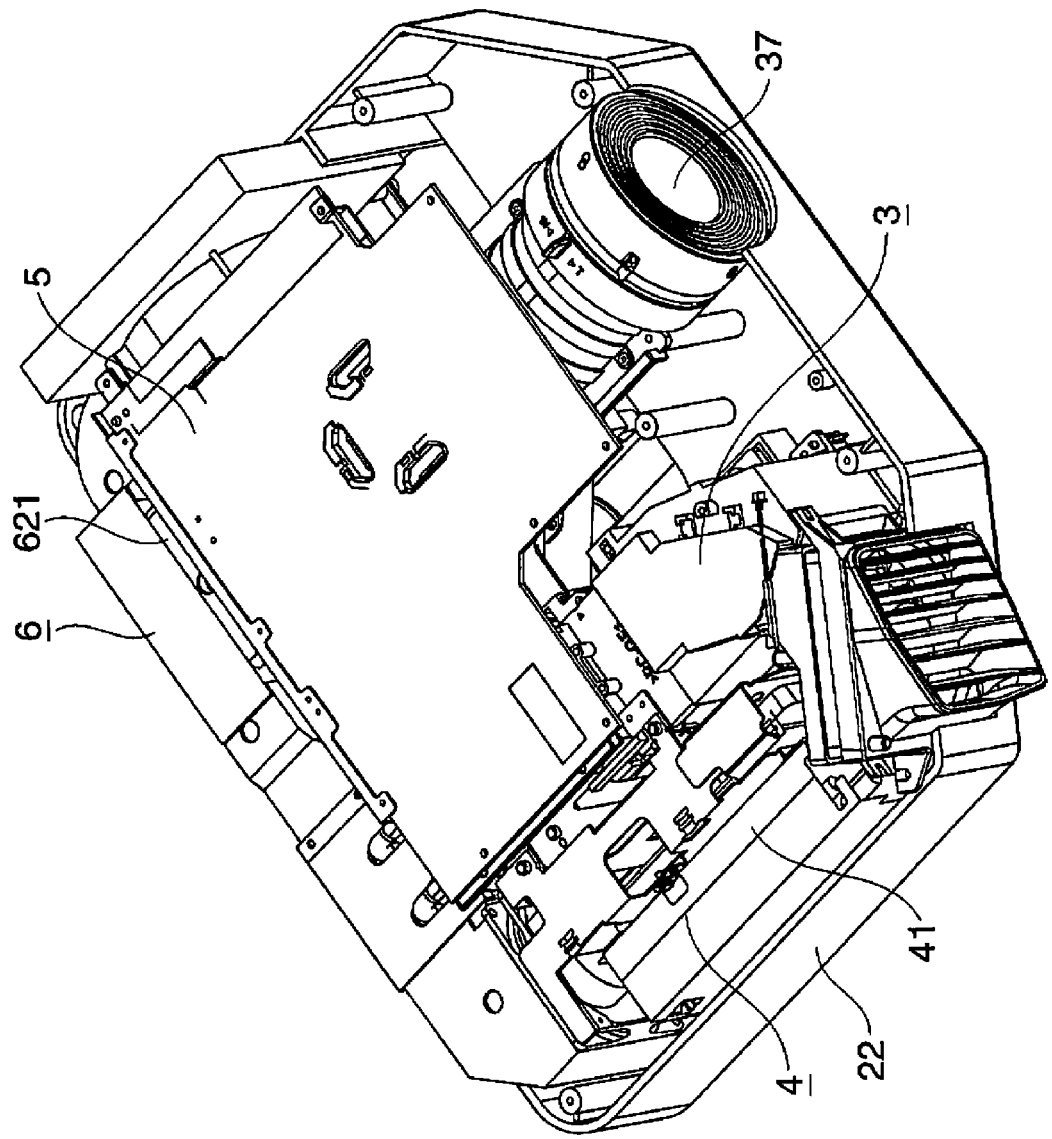
FIG. 2 illustrates the inside structure of the projector in this embodiment.
Figure 3:
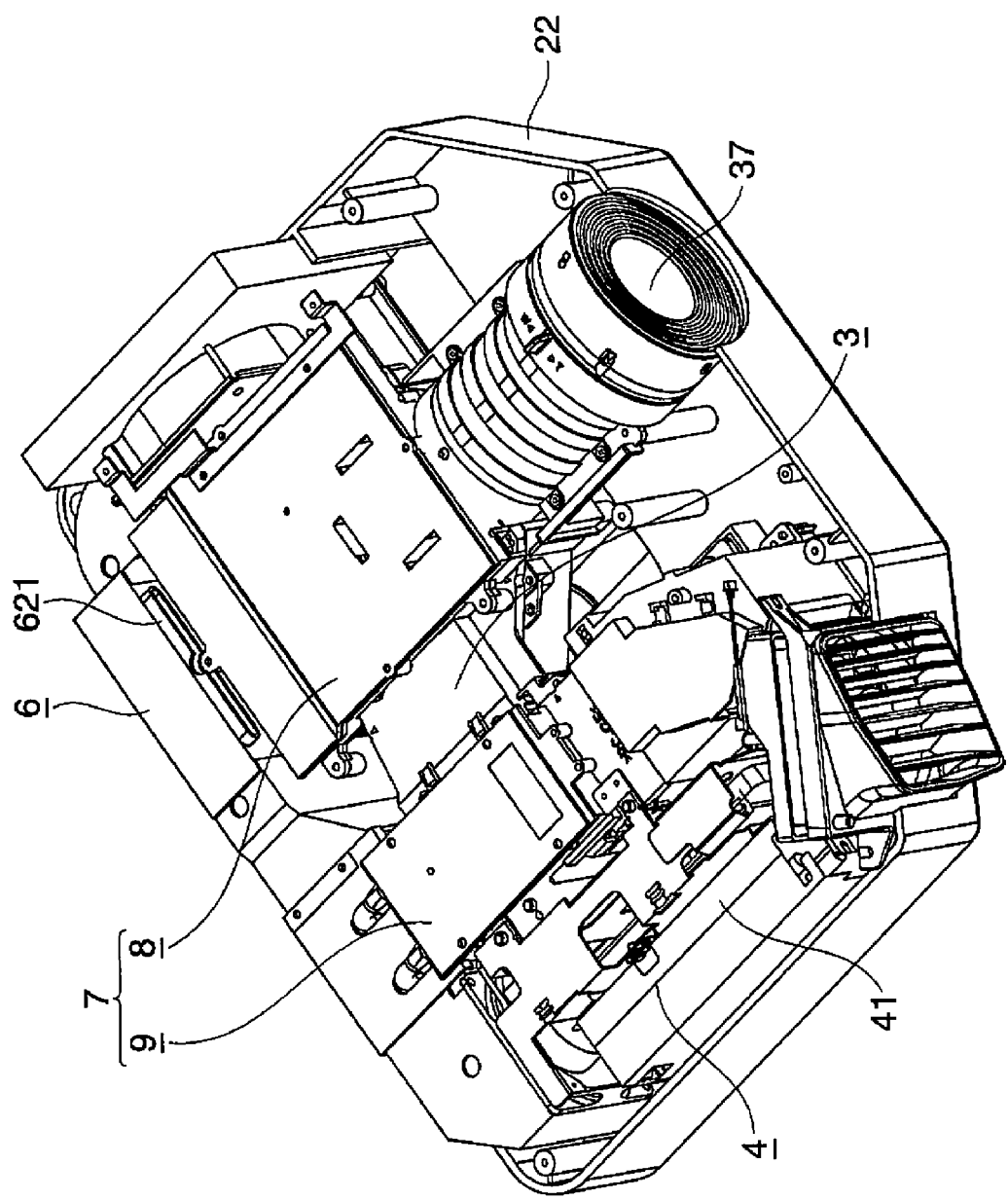
FIG. 3 illustrates the inside structure of the projector in this embodiment.

FIGS. 2 and 3 are perspective views illustrating the internal structure of the projector 1. More specifically, FIG. 2 is a perspective view showing the projector 1 from which the upper case 21 is removed, and FIG. 3 is a perspective view showing the projector 1 in FIG. 2 from which a control board 5 is removed.

As illustrated in FIG. 2 or 3, the main body of the projector 1 is accommodated in the external housing 2. The projector main body includes an optical unit 3, a light source unit 4, the control board 5 (FIG. 2), a housing inside cooling device 6, and a closed circulating air cooling unit 7 (FIG. 3).

Structure of Optical Unit

Figure 4:
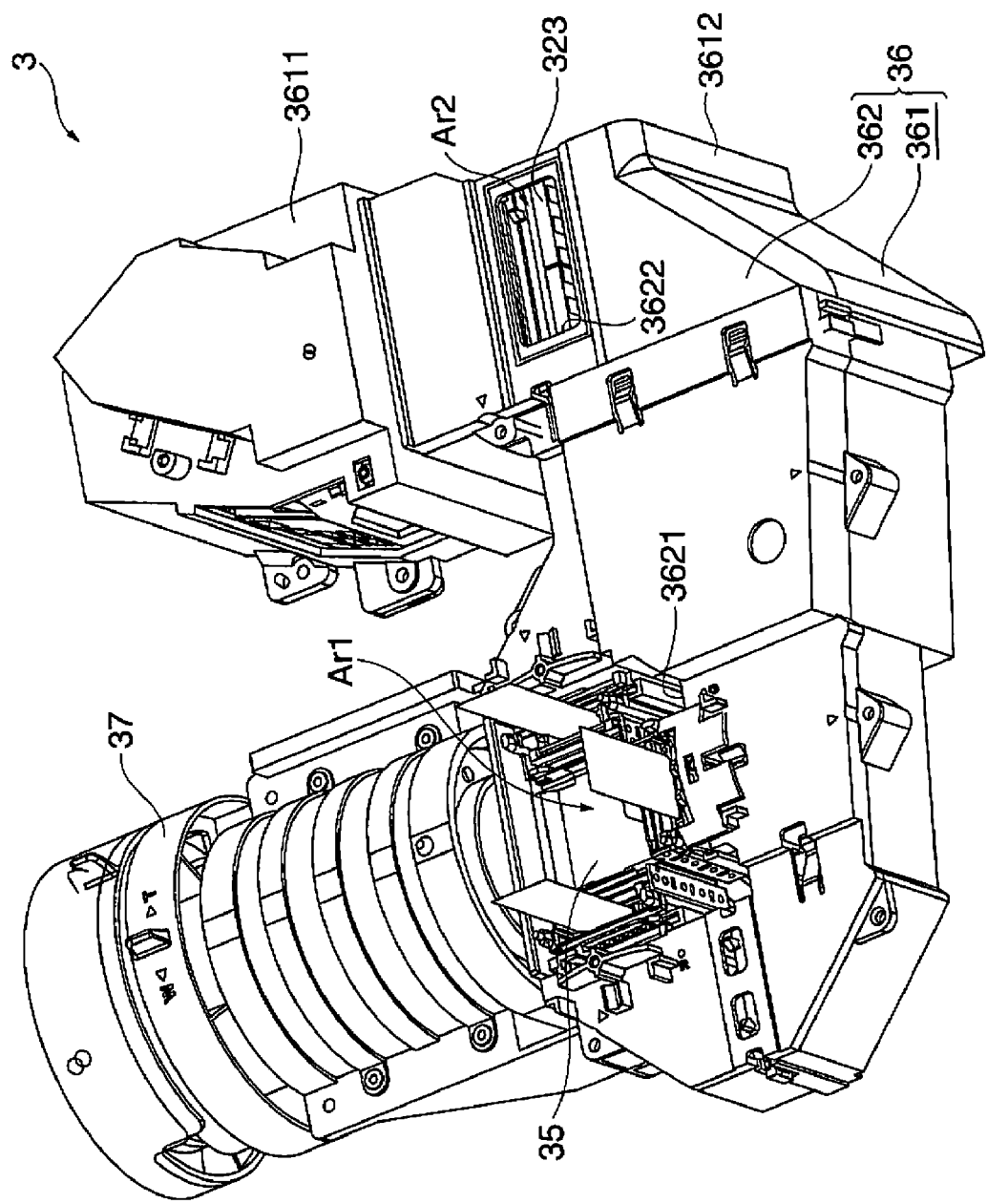
FIG. 4 illustrates a structure of an optical unit in this embodiment.
Figure 5:
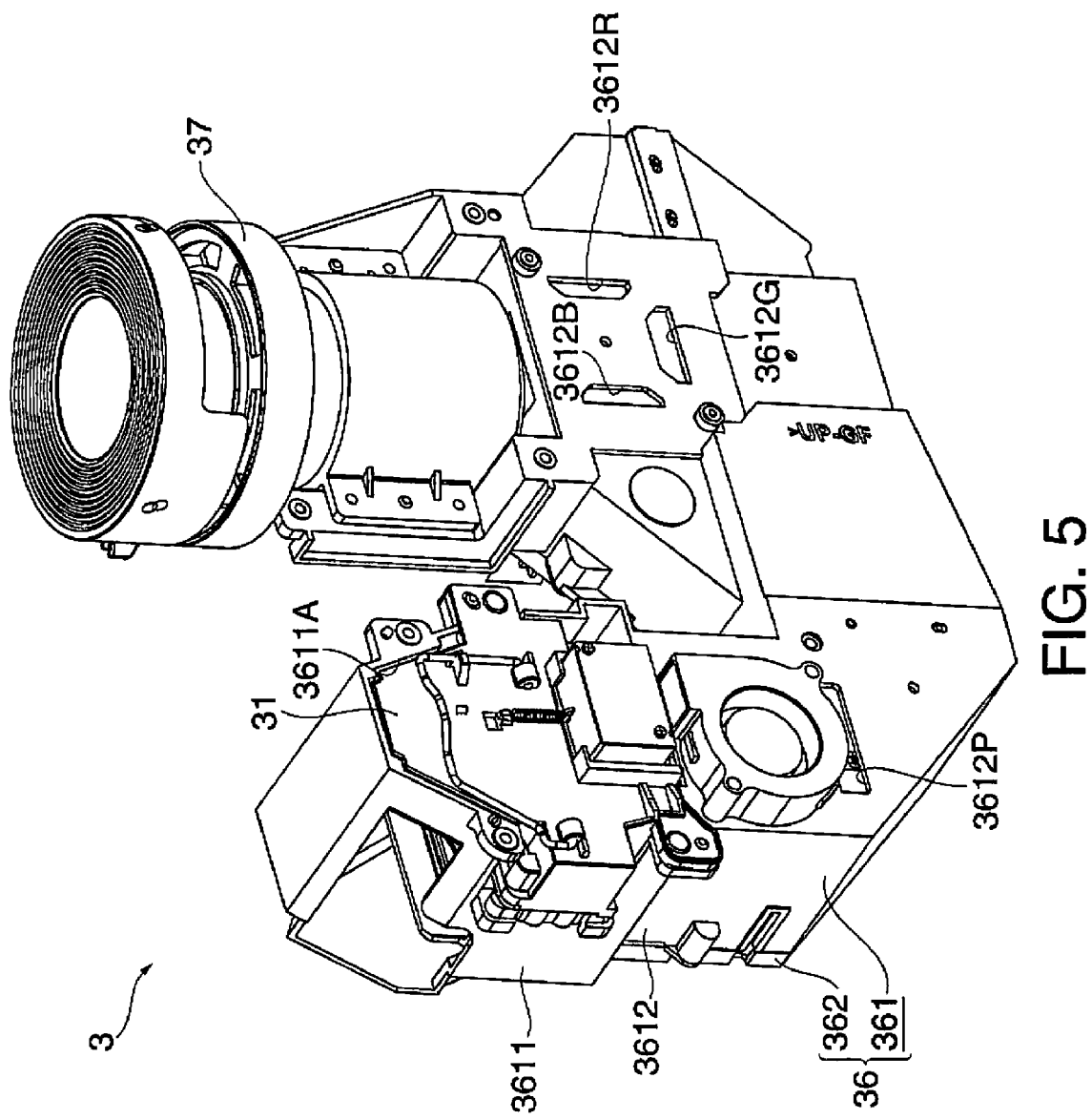
FIG. 5 illustrates the structure of the optical unit in this embodiment.
Figure 6:
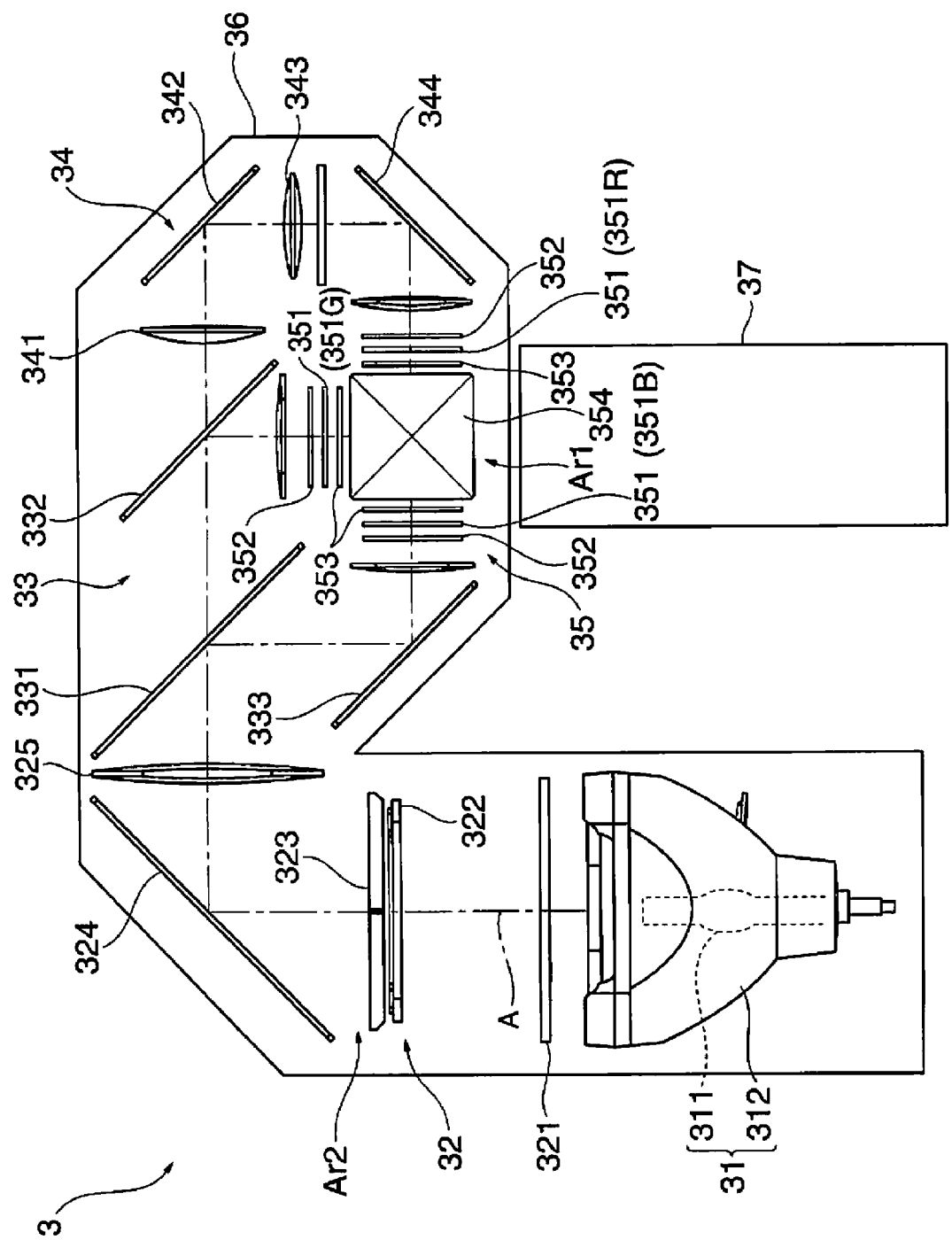
FIG. 6 illustrates the structure of the optical unit in this embodiment.

FIGS. 4 through 6 illustrate the structure of the optical unit 3. More specifically, FIG. 4 is a perspective view of the optical unit 3 as viewed from the upper back, FIG. 5 is a perspective view of the optical unit 3 as viewed from the lower front, and FIG. 6 is a plan view schematically illustrating the optical systems contained in the optical unit 3.

The optical unit 3, which extends from the front toward the back of the external housing 2, forms an image light according to image information under the control of the control board 5. The optical unit 3 has a substantially U shape in the plan view having an end portion in the extending direction which extends while bending to the right and further extends while bending to the front.

As illustrated in FIG. 6, the optical unit 3 includes a light source device 31 having a light source lamp 311 and a reflector 312, a lighting device 32 having lens arrays 321 and 322, a polarization conversion element 323, a reflection mirror 324, and a superimposing lens 325, a color separating device 33 having dichroic mirrors 331 and 332 and a reflection mirror 333, a relay device 34 having an entrance side lens 341, a relay lens 343, and reflection mirrors 342 and 344, an optical device 35 which includes three liquid crystal panels 351 as light modulation devices (red light liquid crystal panel 351R, green light liquid crystal panel 351G, and blue light liquid crystal panel 351B), three entrance side polarization plates 352, three exit side polarization plates 353, and a cross dichroic prism 354 as a color combining device, an optical component housing 36, and a projection lens 37 as a projection device.

The respective optical components 31 through 35 and 37 discussed above are of the types used as optical systems included in various types of typical projectors, and thus specific explanation of those is not given. Therefore, the structure of the optical component housing 36 is chiefly explained herein.

As illustrated in FIG. 4 or 5, the optical component housing 36 has a substantially U shape in the plan view. The optical component housing 36 establishes a predetermined illumination optical axis A (FIG. 6) inside the housing 36, and includes the respective optical components 31 through 35 at predetermined positions with respect to the illumination optical axis A. The optical component housing 36 has a part accommodating member 361 and a cover member 362.

The part accommodating member 361 is constituted by a light source accommodating area 3611 and a part accommodating main body 3612.

The light source accommodating area 3611 is positioned at one end of the U-shaped optical component housing 36, and has a container shape with an opening 3611A (FIG. 5) formed on the lower side. The light source device 31 is accommodated in the light source accommodating area 3611 through the opening 3611A.

The part accommodating main body 3612 has a container shape with an opening (not shown) on the upper side. The respective optical components 32 through 34 are accommodated within the part accommodating main body 3612 through the opening in this order from the one end connecting with the light source accommodating area 3611, and the optical device 35 is contained on the side opposite to the one end. The projection lens 37 is attached to the side surface of the part accommodating main body 3612 opposed to the light source device 35.

The part accommodating main body 3612 has openings 3612R, 3612G, 3612B (FIG. 5) on the lower end surface at positions corresponding to the positions of the liquid crystal panels 351R, 351G, and 351B constituting the optical device 35.

The part accommodating main body 3612 has an opening 3612P (FIG. 5) on the lower end surface at the position corresponding to the position of the polarization conversion element 323.

The openings 3612R, 3612G, 3612B, and 3612P function as inlet ports through which air flows into a space Ar1 (FIGS. 4 and 6) at the position of the optical device 35 and a space Ar2 (FIGS. 4 and 6) at the position of the polarization conversion element 323 inside the optical component housing 36.

The cover member 362 is a component for closing the opening portion on the upper side of the part accommodating main body 3612, and has a substantially the same plan shape as that of the part accommodating main body 3612.

The cover member 362 has a U-shaped notch 3621 (FIG. 4) so formed as to surround the optical device 35 in the plan view at the position corresponding to the position of the optical device 35.

The cover member 362 also has an opening 3622 (FIG. 4) at the position corresponding to the position of the polarization conversion element 323.

The notch 3621 and the opening 3622 function as outlet ports through which air having flowed into the spaces Ar1 and Ar2 inside the optical component housing 36 via the openings 3612R, 3612G, 3612B, and 3612P is discharged to the outside of the optical component housing 36.

Though not specifically shown in the figure, the space Ar1 is so constructed as not to communicate with other adjoining spaces by using the optical components such as ribs formed on the part accommodating main body 3612 and entrance side polarization plate 352 inside the optical component housing 36. Similarly, the space Ar2 provided inside the optical component housing 36 is so constructed as not to communicate with adjoining other spaces by using the optical components such as ribs formed on the part accommodating main body 3612 and the optical components such as lens array 322 and the superimposing lens 325.

Structure of Power Source Unit

The power source unit 4 supplies power to the respective components constituting the main body of the projector 1. As illustrated in FIGS. 2 and 3, the power source unit 4 extends from the back toward the front through the left side surface of the external housing 2. Also, the periphery of the power source unit 4 is covered by a metal shield member 41 such as aluminum which is opened on the front and back sides.

Structure of Control Board

As illustrated in FIG. 2, the control board 5 is a circuit board on which circuit elements such as CPU (central processing unit) are mounted, and disposed above the optical unit 3 via respective downstream ducts 81 and 91 to be described later in the closed circulating air cooling unit 7. The control board 5 controls the operations of the respective components included in the projector 1.

The control structure for controlling the operation of the Peltier element 874 of a heat exchanger 85 constituting the closed circulating air cooling unit 7 and described later will be explained after discussing the detailed structure of the heat exchanger 85.

Structure of Housing Inside Cooling Device

Figure 7:
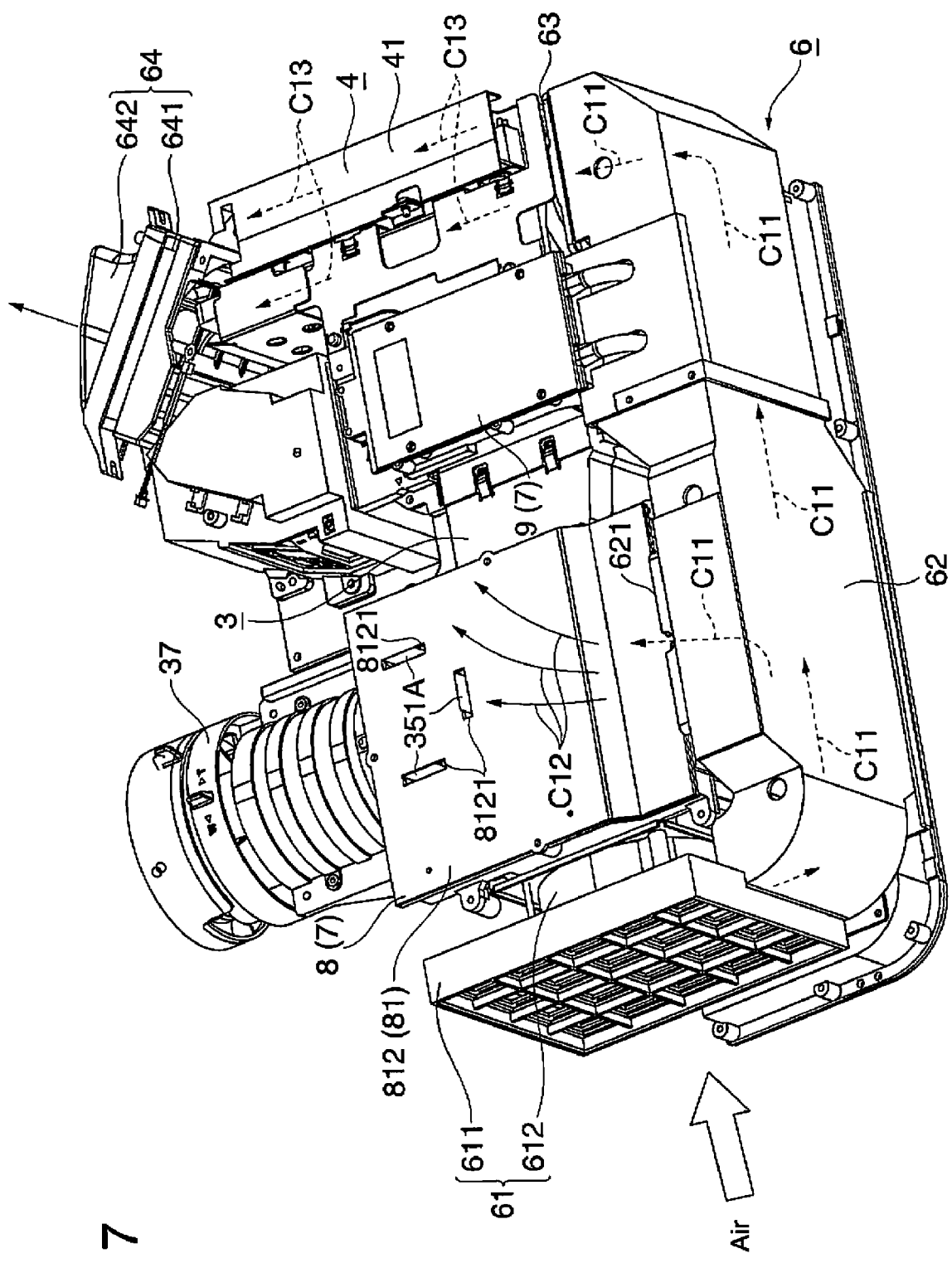
FIG. 7 is a perspective view illustrating a structure of a housing inside cooling device in this embodiment.

FIG. 7 is a perspective view illustrating the structure of the housing inside cooling device 6. More specifically, FIG. 7 is a perspective view as viewed from the upper back of the housing inside cooling device 6.

The housing inside cooling device 6 cools the respective components (control board 5, light source device 31, power source unit 4 and the like) disposed outside the optical component housing 36 inside the external housing 2. As illustrated in FIG. 7, the housing inside cooling device 6 includes an intake unit 61, a junction duct 62, a power source cooling fan 63, and an exhaust unit 64.

The intake unit 61 is disposed at the corner of the right back of the interior of the external housing 2, and introduces cooling air existing outside the external housing 2 into the interior through a first intake port (not shown) formed on the right side surface of the external housing 2 on the back side. The intake unit 61 has an intake side duct 611 through which cooling air AIR is introduced via the first intake port, and an intake fan 612 which delivers the cooling air AIR introduced through the intake side duct 611 toward the back.

One end of the junction duct 62 connects with a delivery port of the intake fan 612, and has a substantially rectangular parallelepiped shape extending toward the back of the power source unit 4 along the back of the external housing 2. The junction duct 62 is constructed such that the air delivered from the intake fan 612 can flow from the right side to the left side of the external housing 2 through a flow path C11.

Though not specifically shown in the figure, two disposition openings for disposing a part of the closed circulating air cooling unit 7 inside are provided on the end surface of the front of the junction duct 62 in parallel with each other in the left-right direction.

Also, a cooling opening 621 (FIGS. 2, 3 and 7) for discharging a part of air flowing through the flow path C11 to the outside is provided on the end surface of the front of the junction duct 62 above the right disposition opening discussed above.

The cooling opening 621 extends in the left-right direction. The height position of the cooling opening 621 is located between the control board 5 and the upper end surface of a first downstream duct 81 to be described later in the closed circulating air cooling unit 7 with the junction duct 62 attached. The air exhausted through the cooling opening 621 flows through a flow path C12 formed between the control board 5 and the upper end surface of the first downstream duct 81 to cool the control board 5 and the upper end surface of the first downstream duct 81.

The power source cooling fan 63 disposed on the back of the power source unit 4 is connected with the other end of the junction duct 62. The power source cooling fan 63 delivers air introduced through the junction duct 62 toward the power source unit 4. The air delivered from the power source cooling fan 63 is guided through the opening on the back of the shield member 41 into the shield member 41. Then, the air flows through a flow path C13 communicating with the inside and outside of the shield member 41 to cool the circuit elements constituting the power source unit 4.

The exhaust unit 64 is disposed at the left front corner of the interior of the external housing 2 to exhaust the air inside the external housing 2 to the outside via an exhaust port 201 (FIG. 1) formed on the left front surface of the external housing 2. The exhaust unit 64 has an exhaust fan 641 for introducing and discharging the inside air (air having flowed through the flow paths C12 and C13 and air around the light source device 31), and an exhaust duct 642 for exhausting the air discharged from the exhaust fan 641 to the outside of the external housing 2 via the exhaust port 201.

Structure of Closed Circulating Air Cooling Unit

Figure 8:
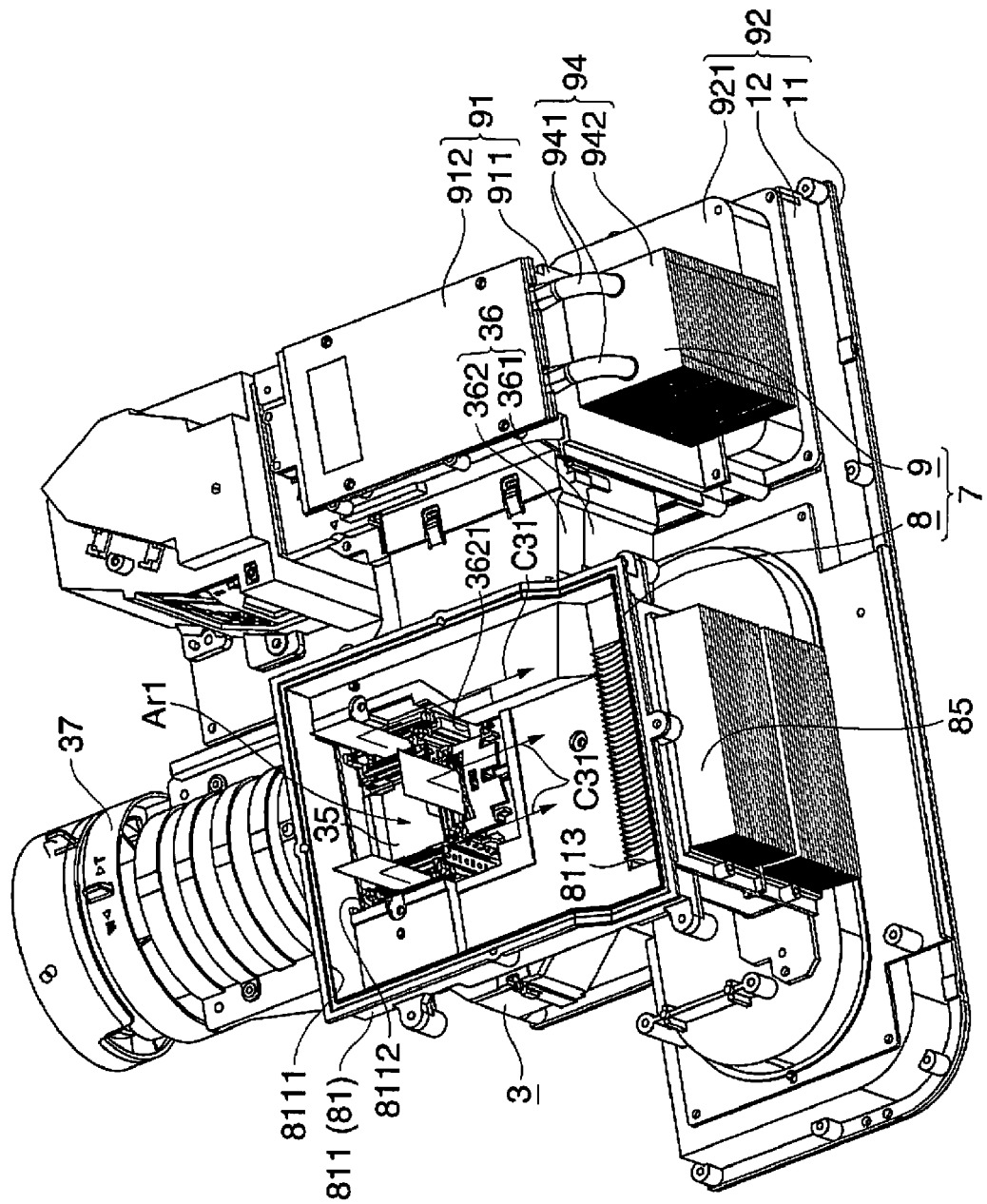
FIG. 8 is a perspective view illustrating a structure of a closed circulating air cooling unit in this embodiment.
Figure 9:
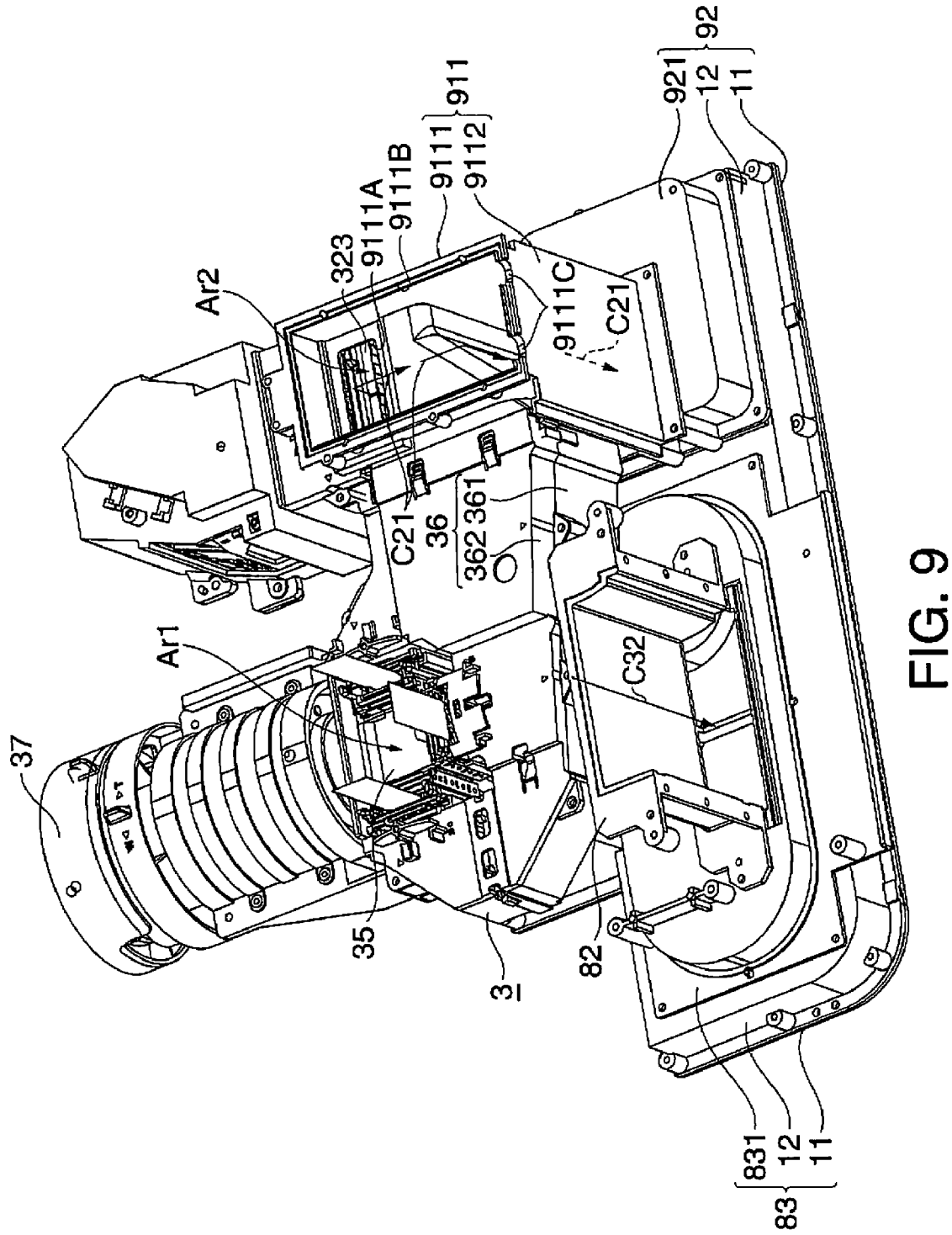
FIG. 9 is a perspective view illustrating the structure of the closed circulating air cooling unit in this embodiment.
Figure 10:
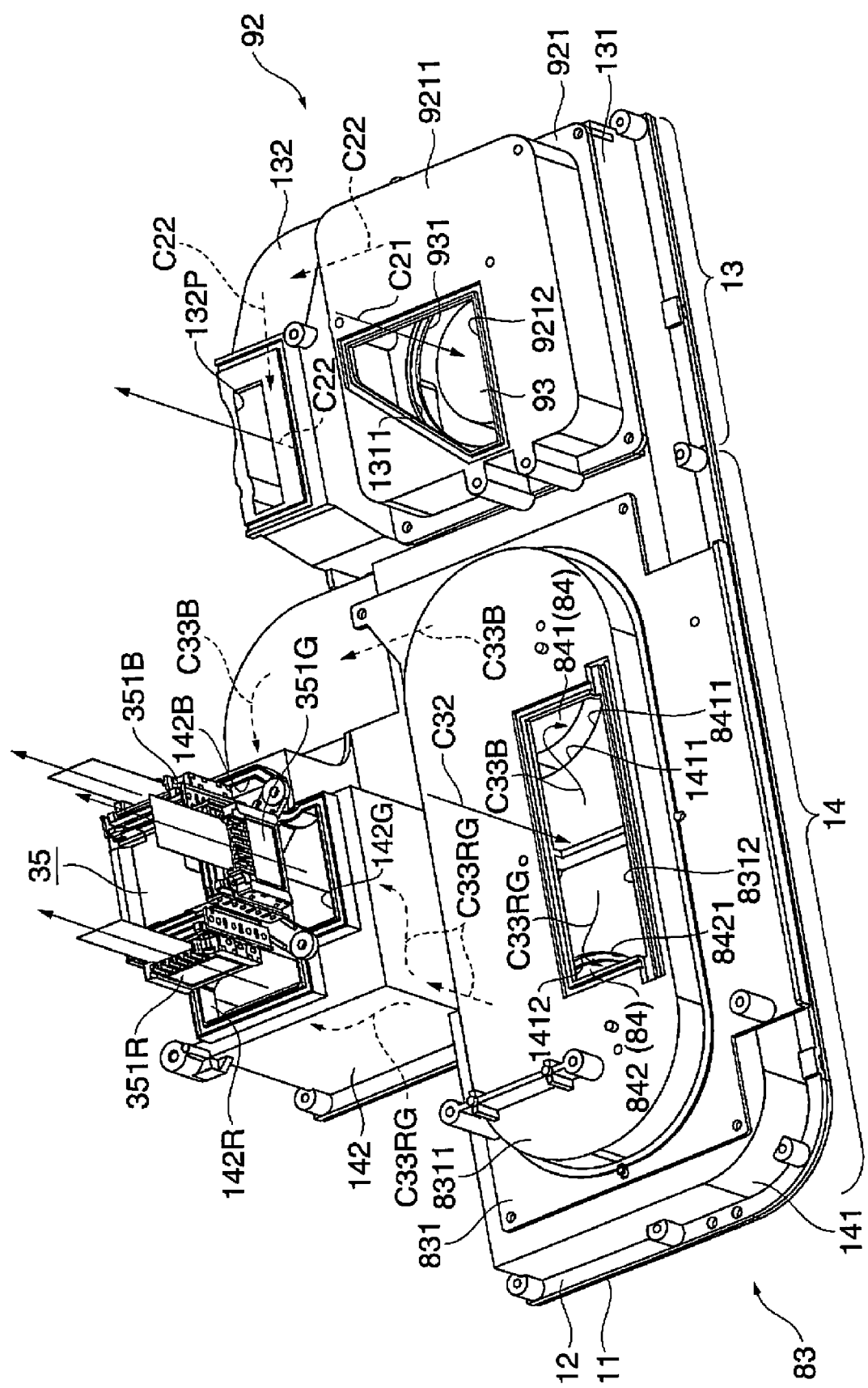
FIG. 10 is a perspective view illustrating the structure of the closed circulating air cooling unit in this embodiment.

FIGS. 8 through 10 are perspective views illustrating the structure of the closed circulating air cooling unit 7. More specifically, FIG. 8 is a perspective view as viewed from above the back of the closed circulating air cooling unit 7 attached to the optical unit 3. FIG. 9 illustrates the closed circulating air cooling unit 7 in the condition shown in FIG. 8 from which the first downstream duct 81, the heat exchanger 85, a cover 912, and a heat release device 94 are detached. FIG. 10 is a perspective view illustrating respective upstream ducts 83 and 92 as viewed from the upper back.

FIG. 8 does not show a cover 812 (FIG. 7) for simplifying the explanation. FIG. 10 shows the optical device 35 (excluding the entrance side polarization plate 352) to show the positional relationship between the upstream ducts 83 and 92 and the optical device 35.

The closed circulating air cooling unit 7 constitutes the closed structure according to the embodiment of the invention as well as the optical component housing 36. As illustrated in FIG. 8, the closed circulating air cooling unit 7 has a first air cooling unit 8 and a second air cooling unit 9.

Structure of Second Air Cooling Unit

The second air cooling unit 9 constitutes a second closed structure together with the optical component housing 36 to circulate air through the second air flow path inside the second closed structure and cool the polarization conversion element 323 disposed in the space Ar2 of the optical component housing 36. As illustrated in FIGS. 8 through 10, the second air cooling unit 9 has the second downstream duct 91 (FIGS. 8 and 9), the second upstream duct 92, a second circulating fan 93 (FIG. 10), and the heat release device 94 (FIG. 8).

In the following explanation, the area upstream from the space Ar2 refers to "upstream", and the area downstream from the space Ar2 refers to "downstream" along the second air flow path. The parts are now discussed in the order from downstream.

The second downstream duct 91 introduces air flowing to the outside from the space Ar2 in the optical component housing 36 toward the second upstream duct 92. As illustrated in FIG. 8 or 9, the second downstream duct 91 has an L-shaped duct part 911 and the cover 912 (FIG. 8).

As illustrated in FIG. 9, the L-shaped duct part 911 has a shape corresponding to the external shape around the position of the polarization conversion element 323 in the optical component housing 36. The L-shaped duct part 911 is the L-shaped component having a horizontal portion 9111 extending from above the space Ar2 toward the back along the upper side end surface of the cover member 362, and a vertical portion 9112 extending downward along the back of the optical component housing 36.

The horizontal portion 9111 has a communicating port 9111A formed on the lower end surface and communicating with the space Ar2 via the opening 3622 at a position corresponding to the opening 3622 of the optical component housing 36.

The horizontal portion 9111 also has an opening 9111B formed on the upper end surface and extending from a position interfering with the communicating port 9111A in the plan view toward the back.

Two notches 9111C are formed on the edge of the opening 9111B on the back side.

The cover 912 is a plate-shaped component for closing the opening 9111B of the L-shaped duct 911.

As illustrated in FIG. 9, air having flowed to the outside from the space Ar2 in the optical component housing 36 is introduced into the L-shaped duct 911 via the communicating port 9111A by assembly of the projector 1. Then, the air flows through the flow path C21 while passing the horizontal portion 9111 and the vertical portion 9112, and is discharged downward from the vertical portion 9112.

The second upstream duct 92 disposed below the optical component housing 36 accommodates the second circulating fan 93 and guides the air having flowed through the flow path C21 inside the second downstream duct 91 toward the space Ar2 in the optical component housing 36. As illustrated in FIG. 10, the second upstream duct 92 has a second air introduction portion 921, the cover 11, and a base 12.

The second air introduction portion 921 is connected with the vertical portion 9112 such that the air having flowed through the flow path C21 can flow into the second upstream duct 92. AS illustrated in FIG. 10, the second air introduction portion 921 is a container-shaped component having a concave 9211 which is concaved upward and has a substantially square shape in the plan view. The opening side of the container shape is attached to the base 12.

The bottom of the concave portion 9211 has a substantially triangular shape corresponding to the external shape of the vertical portion 9112, and has a communicating port 9212 through which the air having flowed through the flow path C21 is introduced to the inside.

The base 12 is a component used in common with the first upstream duct 83 which constitutes the first air cooling unit 8 and will be described later. In this embodiment, only a part 13 (hereinafter referred to as second base part 13) as the left part of the substantially square shape of the base 12 in the plan view is discussed.

The second base part 13 is a container-shaped component having an accommodating concave 131 and a discharging side concave 132 concaved upward and communicating with each other.

The accommodating concave 131 has a substantially square shape in the plan view, and accommodates the second circulating fan 93. The second air introduction portion 921 is attached to the bottom of the accommodating concave 131.

The second circulating fan 93 is a sirocco fan which circulates air inside the second closed structure along the second air flow path. The second circulating fan 93 is accommodated within the accommodating concave 131 such that an intake port 931 faces upward and a discharge port (not shown) faces frontward.

The accommodating concave 131 has a substantially circular opening 1311 at a position facing the intake port 931.

The discharge side concave 132 is disposed at a position corresponding to the position of the polarization conversion element 323. Also, the discharge side concave 132 is located on the front side from the accommodating concave 131, and expands upward from the accommodating concave 131. The bottom of the discharge side concave 132 has a communicating port 132P formed at a position corresponding to the opening 3612P of the optical component housing 36 and communicating with the space Ar2 via the opening 3612P.

The cover 11 is a component used in common with the first upstream duct which constitutes a first air cooling unit 8 and will be described later similarly to the base 12. The cover 11 is a plate-shaped component for closing the opening of the lower portion of the base 12 (second base 13).

As illustrated in FIG. 10, air having flowed to the outside through the second downstream duct 91 is introduced into the second air introduction portion 921 via the communication port 9212 by assembly of the projector 1. Then, the air flows through the flow path C22 while passing the second air introduction port 921, the accommodating concave 131 (second circulating fan 93), and the discharge side concave 132, and is introduced into the space Ar2 via the communicating port 132? and the opening 3612P.

Thus, the annular second air flow path inside the second closed structure is formed by the flow paths C21 and C22, and the space Ar2 discussed above. In this structure, air flows through the second annular air flow path of the flow paths C21 and C22 and the space Ar2 and then returns to the flow path C21 to cool the polarization conversion element 323 inside the space Ar2.

Though not specifically shown in the figure, the optical component housing 36 and the second air cooling unit 9 constitute a closed structure which prevents communication between the second air flow path and the outside by interposing an elastic seal member or the like between each of the components.

The heat release device 94 receives heat from air flowing through the flow path C21 inside the second closed structure, and releases the heat to the outside of the second closed structure. As illustrated in FIG. 8, the heat release device 94 has two heat pipes 941 and a heat release member 942.

The two heat pipes 941 are bent to have an L shape. One end of each of the heat pipes 941 is disposed inside the second downstream duct 91 via the notch 9111C formed on the second downstream duct 91 and connected with the inner surface of the cover 912.

Though not specifically shown in the figure, a plurality of fins made of metal or other heat conductive materials are provided on the inner surface of the cover 912 to form heat receiving members for receiving heat from air flowing through the flow path C21.

The one end of each of the two heat pipes 941 is connected with the heat receiving member such that heat is transferable, and the other end of the heat pipe 941 is connected with the heat release member 942 such that heat is transferable. Thus, the two heat pipes 941 introduce heat transfered from the air flowing through the flow path C21 to the heat receiving member from the inside of the second closed structure to the outside, and transfer the heat to the heat release member 942.

The heat release member 942 is disposed on the back side of the external housing 2 to release heat transferred via the heat pipes 941. The heat release member 942 has a plurality of plate-shaped fins made of metal or other heat conductive materials, and has a structure formed by laminating the fins in the vertical direction in parallel with each other. The other end of each of the two heat pipes 941 penetrates through the respective fins from the upper side to the lower side, and connects the respective fins such that heat is transferable.

The heat release member 942 is disposed inside the junction duct 62 through the disposition opening of the junction duct 62 in the condition of assembly of the projector 1. Thus, heat having flowed through the heat transferring path while passing the heat receiving member and the two heat pipes 941 and reached the heat release member 942 is cooled by the air flowing through the flow path C11 inside the junction duct 62.

Structure of First Air Cooling Unit

The first air cooling unit 8 constitutes the first closed structure together with the optical component housing 36, and cools the optical device 35 disposed in the space Ar1 of the optical component housing 36 by circulating air through the first air flow path inside the first closed structure. As illustrated in FIGS. 8 through 10, the first air cooling unit 8 has the first downstream duct 81 (FIG. 8), the a connection duct 82 (FIG. 9), the first upstream duct 83, the first circulating fan 84 (FIG. 10), and the heat exchanger 85 (FIG. 8).

In the following explanation, the area upstream from the space Ar1 refers to "upstream", and the area downstream from the space Ar1 refers to "downstream" along the first air flow path. The parts are now discussed in the order from downstream.

The first downstream duct 81 is a component for guiding air having flowed to the outside from the space Ar1 in the optical component housing 36 toward the connection duct 82. As illustrated in FIG. 8, the first downstream duct 81 has a duct main body 811 and a cover 812 (FIG. 7).

The duct main body 811 extends from above the space Ar1 through the upper end surface of the cover member 362 toward the back, and has a container shape having an opening 8111 on the upper side.

The lower end surface of the duct main body 811 has a communicating port 8112 communicating with the space Ar1 via the notch 3621 at a position corresponding to the notch 3621 of the cover member 362.

The lower end surface of the duct main body 811 on the back side has a rectangular communicating port 8113 for exhausting the inside air to the outside.

The cover 812 is a plate-shaped component for closing the opening 8111 of the duct main body 811.

As illustrated in FIG. 7, the cover 812 has holes 8121 through which respective FPC cables 351A connecting the respective liquid crystal panels 351 and the control board 5 are inserted. The clearances between the respective holes 8121 and the FPC cables 351A are sealed by rubber, sponge or the like such that the closed condition inside the first downstream duct 81 can be maintained.

As illustrated in FIG. 8, the air having flowed to the outside from the space Ar1 in the optical component housing 36 is introduced into the duct main body 811 via the communicating port 8112 by assembly of the projector 1. Then, the air flows through the flow path C31 toward the back, and is discharged downward through the communicating port 8113.

The connection duct 82 is disposed on the back side of the optical component housing 36. The connection duct 82 is a component on which the heat exchanger 85 is mounted. The connection duct 82 guides the air having flowed through the flow path C31 inside the first downstream duct 81 toward the first upstream duct 83.

As illustrated in FIG. 9, the connection duct 82 has a substantially U-shaped cross section extending in the up-down direction, and is disposed such that the opening of the U-shaped cross section faces the back. A flow path C32 through which air flows in the up-down direction can be formed by disposing the heat exchanger 85 at the opening of the U-shaped cross section of the connection duct 82 to close the opening by the heat exchanger 85.

The upper end of the connection duct 82 connects with the periphery of the communicating port 8113 of the first downstream duct 81 by assembly of the projector 1, and the air having flowed to the outside from the first downstream duct 81 flows through the flow path C32 to be discharged downward.

The first upstream duct 83 is disposed below the optical component housing 36 to accommodate the first circulating fan 84 and introduce the air having flowed through the flow path C32 inside the connection duct 82 toward the space Ar1 in the optical component housing 36. The first upstream duct 83 has a first air introduction portion 831, the cover 11, and the base 12.

The first air introduction portion 831 connects with the lower end of the connection duct 82, and introduces the air having flowed through the flow path C32 toward the inside of the first upstream duct 83. As illustrated in FIG. 10, the first air introduction portion 831 is a container-shaped component having a substantially elliptic concave 8311 concaved upward in the plan view, and the opened side of the container shape is attached to the base 12.

The bottom of the concave 8311 has a communicating port 8312 having a substantially rectangular shape corresponding to the external shape of the connection duct 82 and introducing the air having flowed through the flow path C32 into the inside.

As discussed above, the base 12 is a component used in common with the first air cooling unit 8. Thus, only a substantially rectangular part 14 (hereinafter referred to as first base 14) in the plan view on the left side of the base 12 is now explained.

The first base 14 is formed integrally with the second base 13, and is a container-shaped component having an accommodating concave 141 and a discharge side concave 142 concaved upward and communicating with each other.

The accommodating concave 141 has a substantially rectangular shape in the plan view, and accommodates the first circulating fan 84 (841 and 842: both are disposed in parallel with each other) in the left-right direction. The first air introduction port 831 is attached to the outer surface of the bottom of the accommodating concave 141.

The first circulating fan 84 circulates air through the first annular air flow path inside the first closed structure. The first circulating fan 84 is constituted by two fans of B sirocco fan 841 and RG sirocco fan 842. The B sirocco fan 841 is accommodated in the accommodating concave 141 such that an inlet port 8411 faces upward and that an outlet port (not shown) faces the front. The RG sirocco fan 842 is accommodated in the accommodating concave 141 such that an inlet port 8421 faces upward and an outlet port (not shown) is inclined from the front to the left.

The accommodating concave 141 has substantially circular openings 1411 and 1412 at positions corresponding to the respective inlet ports 8411 and 8421.

The discharge side concave 142 is disposed at a position corresponding to the position of the optical device 35 on the front side from the accommodating concave 141, and expands upward from the accommodating concave 141. The bottom of the discharge side concave 142 has communicating ports 142R, 142G, and 142B corresponding to the respective openings 3612R, 3612G, and 3612B of the optical component housing 36 and communicating with the space Ar1 via the openings 3612R, 3612G, and 3612B.

The cover 11 closes the opening on the lower side of the second base 13 of the base 12, and also closes the opening on the lower side of the first base 14.

As illustrated in FIG. 10, air having flowed to the outside from the connection duct 82 is introduced into the first air introduction portion 831 via the communicating port 8312, and then branched into two parts inside the first air introduction portion 831 by assembly of the projector 1.

One of the air parts branched inside the first air introduction portion 831 flows through a flow path C33B passing the first air introduction portion 831, the accommodating concave 141 (B sirocco fan 841), and the discharge side concave 142, and then is introduced to the space Ar1 via the communicating port 142B and the opening 3612B.

The other air part branched inside the first air introduction portion 831 flows through a flow path C33RG passing the first air introduction portion 831, the accommodating concave 141 (RG sirocco fan 842), and the discharge side concave 142, and is further branched into two parts in the discharge side concave 142.

One of the air parts branched in the discharge side concave 142 is introduced into the space Ar1 via the communicating port 142R and the opening 3612R.

The other air part branched in the discharge side concave 142 is introduced into the space Ar1 via the communicating port 142G and the opening 3612G.

Thus, the first annular air flow path in the first closed structure is constituted by the flow paths C31, C32, C33B, C33RG, and the space Ar1. In this structure, air flows through the first annular flow path constituted by the flow paths C31, C32, and C33B, C33RG, space Ar1, and returns to the flow path C31 by the function of the first circulating fan 84 to cool the optical device 35 (liquid crystal panel 351, entrance side polarization plate 352, exist side polarization plate 353, and others) in the space Ar1.

Though not specifically shown in the figure, the optical component housing 36 and the first air cooling unit 8 have a closed structure which prevents communication between the first air flow path and the outside by interposing an elastic seal member or the like between each component.

The heat exchanger 85 is disposed on the connection duct 82 to receive heat of air flowing through the flow path C32 in the first closed structure and release the heat to the outside of the first closed structure. The detailed structure of the heat exchanger 85 will be described later.

The heat exchanger 85 is disposed on the opening of the U-shaped cross section of the connection duct 82 such that the front portion of the heat exchanger 85 is positioned inside of the connection duct 82. By this structure, the front portion of the heat exchanger 85 receives the heat of the air flowing through the flow path C32 on the front part and transfers the heat to the back part of the heat exchanger 85.

The back part of the heat exchanger 85 is disposed inside the junction duct 62 via the disposition opening of the junction duct 62 in the condition of assembly of the projector 1. Thus, the heat transferred from the front portion to the back portion of the heat exchanger 85 is cooled by the air flowing through the flow path C11 inside the junction duct 62.

Detailed Structure of Heat Exchanger

Figure 11:
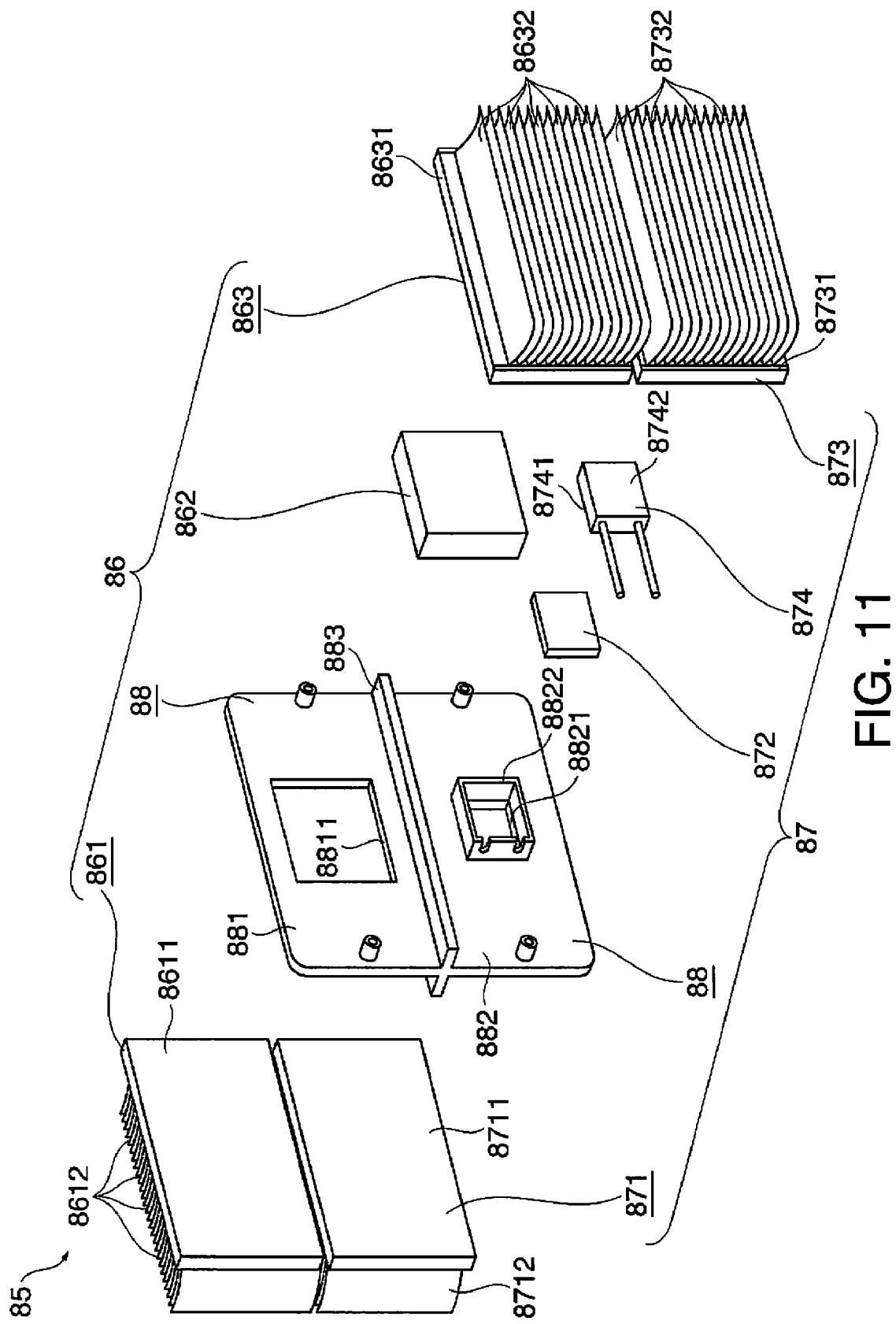
FIG. 11 is a perspective view illustrating a disassembled structure of a heat exchanger in this embodiment.
Figure 12:
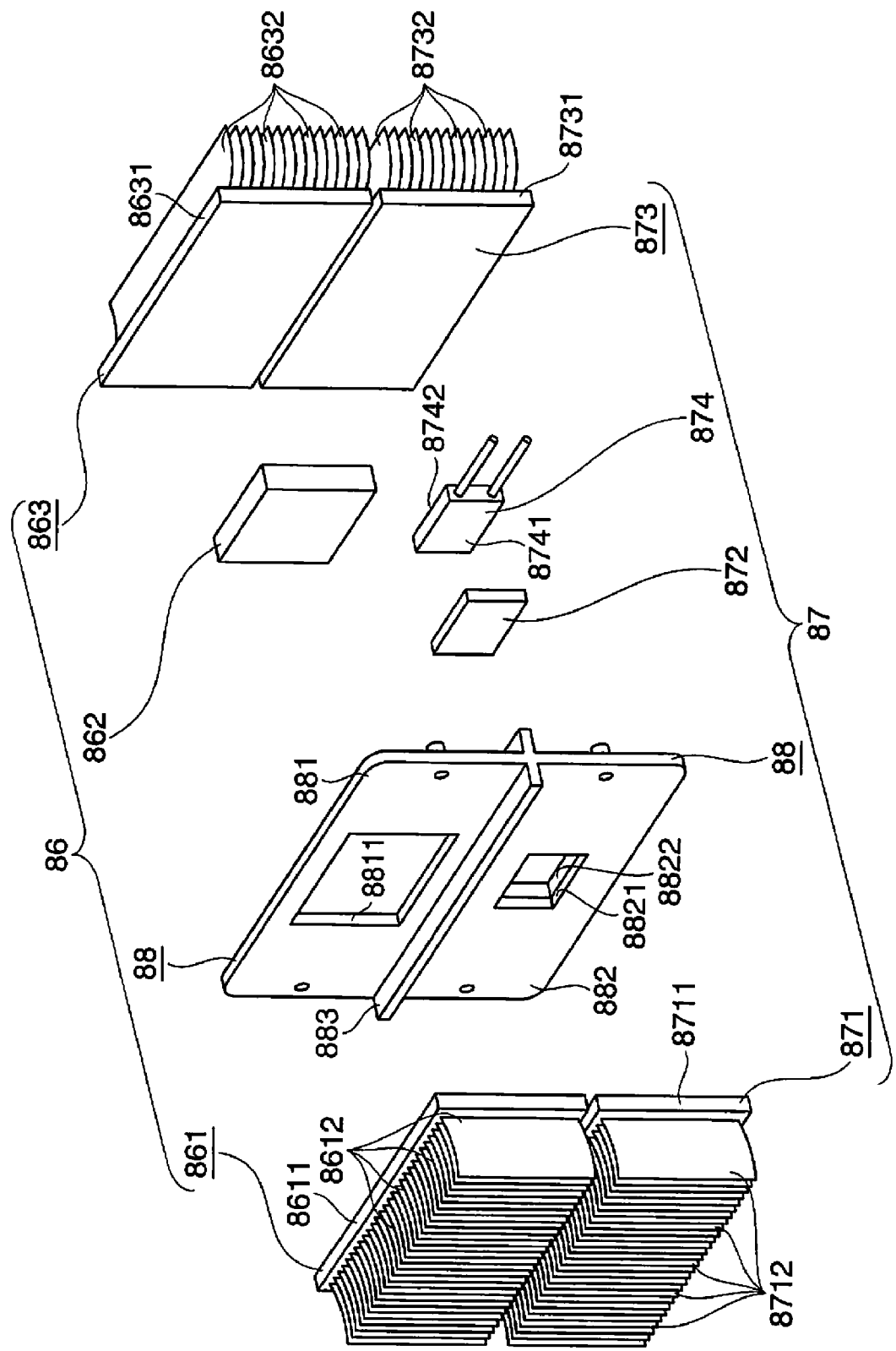
FIG. 12 is a perspective view illustrating a disassembled structure of the heat exchanger in this embodiment.

FIGS. 11 and 12 are perspective views showing disassembled structure of the heat exchanger 85. More specifically, FIG. 11 illustrates the heat exchanger 85 as viewed from the back, and FIG. 12 illustrates the heat exchanger 85 as viewed from the front.

As illustrated in FIG. 11 or 12, the heat exchanger 85 is constituted by a passive-type heat exchanger 86 and an active-type heat exchanger 87.

Structure of Passive-type Heat Exchanger

The passive-type heat exchanger 86 has a heat receiving side heat transfer member 861, an attachment member 88, a block 862, and a heat releasing side heat transfer member 863.

The heat receiving side heat transfer member 861 is disposed inside the connection duct 82 with the heat exchanger 85 attached to the connection duct 82. The heat receiving side heat transfer member 861 is a so-called heat sink having a rectangular plate body 8611 and a plurality of fins 8612 projecting from the front end surface of the plate body 8611 and extending in the vertical direction. The heat receiving side heat transfer member 861 receives heat from air flowing through the flow path C32.

The attachment member 88 is a component used in common with the active-type heat exchanger 87. Only an upper part 881 (hereinafter referred to as first attachment part 881) of the attachment member 88 is now explained.

The first attachment part 881 is a component for combining the respective members 861 through 863 as one body and attaching the combined body to the connection duct 82. The first attachment part 881 is made of material having low heat conductivity (such as 0.9 W/(mK) or lower), as a plate-shaped rectangular component having an external shape larger than that of the plate body 8611. The first attachment part 881 closes the opening of the U-shaped cross section of the connection duct 82 with the heat exchanger 85 attached to the connection duct 82.

The first attachment part 881 has an opening 8811 engaging with a block 862 substantially at the center.

Though not specifically shown in the figure, the heat receiving side heat transfer member 861 is fixed to the front end surface of the first attachment part 881 by screw or the like.

The block 862 is a substantially parallelepiped plate body made of metal or other heat conductive material, and engages with the opening 8811 of the first attachment part 881. The block 862 has a thickness slightly larger than that of the first attachment part 881. The block 862 is connected with the plate body 8611 of the heat receiving side heat transfer member 861 such that heat is transferable to the plate body 8611 under the condition of assembly of the heat exchanger 85.

The heat release side heat transfer member 863 is disposed inside the junction duct 62 via the disposition opening of the junction duct 62 in the condition in which the heat exchanger 85 is assembled and incorporated in the projector 1. The heat release side heat transfer member 863 is a heat sink having a plate body 8631 and a plurality of fins 8632 similarly to the heat receiving side heat transfer member 861. The plural fins 8632 extend in the direction (left-right direction) substantially orthogonal to the extension direction of the plural fins 8612 of the heat receiving side heat transfer member 861.

Though not specifically shown in the figure, the heat releasing side heat transfer member 863 is fixed to the back end surface of the first attachment part 881 by screw or the like. In this condition, the block 862 is sandwiched between the heat releasing side heat transfer member 863 and the heat receiving side heat transfer member 861. That is, a heat transfer path passing the heat receiving side heat transfer member 861, the block 862, and the heat releasing side heat transfer member 863 is formed in the passive-type heat exchanger 86.

Structure of Active-Type Heat Exchanger

The active-type heat exchanger 87 is disposed below the passive-type heat exchanger 86. The active-type heat exchanger 87 includes a heat receiving side heat transfer member 871 constituted by a plate body 8711 and a plurality of fins 8712, the attachment member 88, a block 872, a heat releasing side heat transfer member 873 having a plate body 8731 and a plurality of fins 8732, and a Peltier element 874 as a thermoelectric conversion element each of which has the same functions and shapes as those of the passive-type heat exchanger 86.

As discussed above, the attachment member 88 is a component used in common with the passive-type heat exchanger 86, only a lower part 882 (hereinafter referred to as second attachment part 882) of the attachment member 88 is now explained.

The second attachment member 882 is a component projecting from the front and back end surfaces of the attachment member 88 and formed integrally with the first attachment part 881 via a sectioning portion 883 for sectioning the first attachment part 881. Thus, the second attachment part 882 is a component for combining the respective members 871 through 874 into one body and attaching the body to the connection duct 82. The second attachment part 882 has an external shape approximately the same shape as that of the first attachment part 881.

The second attachment part 882 has an opening 8821 engaging with the block 872 substantially at the center similarly to the first attachment part 881.

The second attachment part 882 has a support portion 8822 which has a frame shape projecting from the periphery of the opening 8821 toward the back and supports the outer periphery of the Peltier element 874 inside the frame shape.

Though not specifically shown in the figure, the Peltier element 874 has a plurality of connection pairs each of which is formed by connecting p-type semiconductor and n-type semiconductor using metal pieces. These plural connection pairs are electrically and directly connected with one another.

When electric power is supplied to the Peltier element 874 having this structure under the control of the control board 5, the front end surface of the Peltier element 874 becomes a heat absorbing surface 8741 for absorbing heat. Also, the back end surface becomes a heat releasing surface 8742 for releasing heat.

The combined length of the thicknesses of the block 872 and the Peltier element 874 is set at a length slightly larger than the length from the front end surface of the second attachment part 882 to the end of the support portion 8822 in the projection direction.

The Peltier element 874 engages with the support portion 8822 of the second attachment part 882 in the condition of assembly of the heat exchanger 85. Thus, the heat absorbing surface 8741 is connected with the block 872 such that heat is transferable, and the heat releasing surface 8742 is connected with the heat releasing side heat transfer member 873 such that heat is transferable. As a result, a heat transmission path passing the heat receiving side heat transfer member 871, the block 872, the Peltier element 874, and the heat releasing side transfer member 873 is formed in the active-type heat exchanger 87.

Control Structure of Peltier Element

Figure 13:
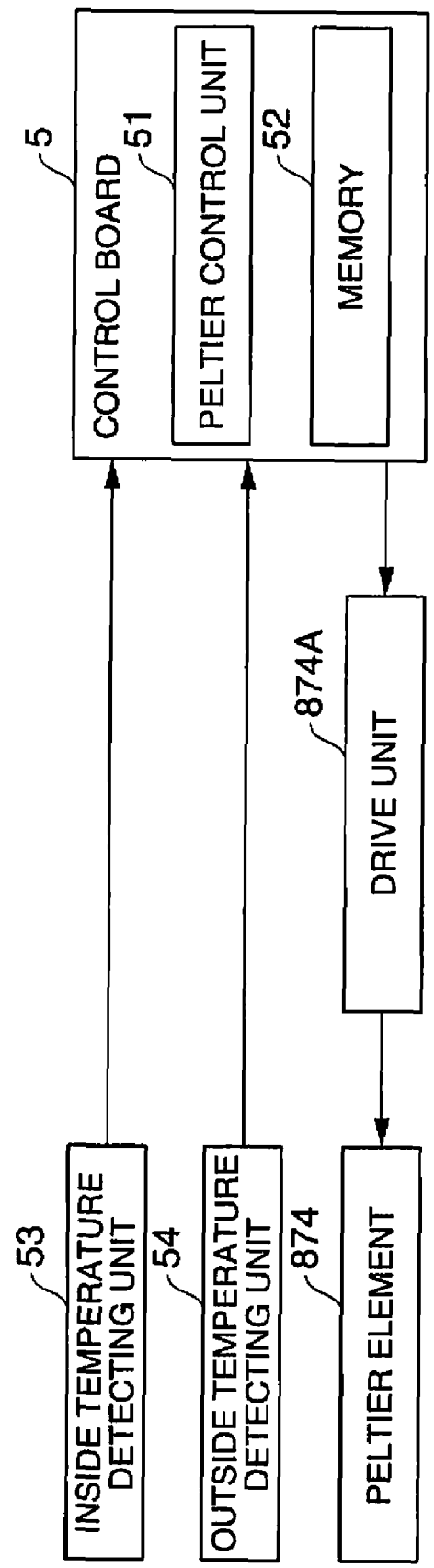
FIG. 13 is a block diagram schematically showing a control structure of a Peltier element in this embodiment.

FIG. 13 is a block diagram schematically showing the control structure of the Peltier element 874.

As illustrated in FIG. 13, the control board 5 has a Peltier control unit 51 and a memory 52 to provide a function of controlling the operation of the Peltier element 874.

The Peltier control unit 51 outputs a predetermined command to a drive unit 874A which supplies power to the Peltier element 874 to control the operation of the Peltier element 874.

The Peltier control unit 51 stops power supply to the Peltier element 874 and gives the same function as that of the passive-type heat exchanger 86 not using the Peltier element to the active-type exchanger 87 in appearance.

For example, the Peltier control unit 51 compares the inside temperature detected by an inside temperature detecting unit 53 constituted by a thermister or the like connected with the control board 5 and detecting the inside temperature of the first closed structure, and a first set temperature based on first set temperature information stored in the memory 52. When the inside temperature is the first set temperature or lower, the Peltier control unit 51 outputs the predetermined control command to the drive unit 874A to stop power supply to the Peltier element 874.

Also, the Peltier control unit 51 compares the outside temperature (atmospheric temperature) detected by an outside temperature detecting unit 54 constituted by a thermister or the like connected with the control board 5 and detecting the atmospheric temperature outside the first closed structure, for example, and a second set temperature based on second set temperature information stored in the memory 52. When the outside temperature is the second set temperature or lower, the Peltier control unit 51 outputs the predetermined control command to the drive unit 874A to stop power supply to the Peltier element 874.

The memory 52 stores a control program under which the Peltier control unit 51 performs processes, necessary information for performing the processes (first set temperature information and second set temperature information) and the like.

According to this embodiment, the following advantages can be offered.

In this embodiment, the optical device 35 is accommodated in the space Ar1 inside the optical component housing 36 constituting the first closed structure. Thus, adhesion of dust, soot or the like to the optical device 35 can be prevented, and stable image quality of the projection image projected from the projector 1 can be secured for a long period.

The heat exchanger 85 constituting the first closed structure is constituted by the two types of exchanger: passive-type heat exchanger 86 and active-type heat exchanger 87. Thus, heat of air inside the first closed structure is received by the heat receiving side heat transfer members 861 and 871, and released by the heat releasing side heat transfer members 863 and 873 to the outside of the first closed structure at the two positions in the flow path C32. Thus, when the amount of heat generated from the optical device 35 is large, for example, the air inside the first closed structure is efficiently cooled. Accordingly, efficient cooling of the optical device 35 can be achieved.

Moreover, the two heat exchangers 86 and 87 are disposed in series in the vertical direction, that is, in the air flow direction. Thus, air flowing through the flow path C32 can be cooled by two steps in the order from the passive-type heat exchanger 86 positioned upstream of the flow path C32. Accordingly, air having lower temperature can be supplied toward the optical device 35 accommodated in the optical component housing 36, and the optical device 35 can be thus cooled with higher efficiency.

In this structure, the two heat exchangers 86 and 87 are disposed close to each other. Thus, temperature increase of air between the respective heat exchangers 86 and 87 can be prevented, and the temperature of air can be lowered by two steps when the air flows through the respective heat exchangers 86 and 87, compared with the case where the two heat exchangers 86 and 87 are disposed away from each other, for example.

The passive-type heat exchanger 86 does not have Peltier element. Air warmed by the optical device 35 and having large temperature difference from the outside temperature initially flows to the passive-type heat exchanger 86. Thus, heat can be absorbed from the air inside the first closed structure by using the passive-type heat exchanger 86 with the same efficiency as that of the structure using the Peltier element. In this case, elimination of the Peltier element contributes to cost reduction and power saving of the projector 1.

Moreover, the active-type heat exchanger 87 has the Peltier element 874. More specifically, the temperature of the air flowing through the passive-type heat exchanger 86 lowers, and therefore air having small temperature difference from the outside temperature flows through the active-type heat exchanger 87. Accordingly, the temperature of the air having cooled by the passive-type heat exchanger 86 can be further decreased by the active-type heat exchanger 87.

When the inside temperature of the first closed structure is low (for example, when the inside temperature is lower than a target temperature of the optical device 35 of the liquid crystal panel 351 or the like), that is, when temperature decrease of the air inside the first closed structure is not necessary, power supply to the Peltier element 874 is stopped by the Peltier control unit 51 constituting the control board 5. Thus, power saving of the projector 1 can be achieved.

Also, power supply to the Peltier element 874 is stopped by the Peltier control unit 51 when the temperature difference between the inside temperature of the first closed structure and the outside temperature which is low is large. More specifically, in the case discussed above, power supply to the Peltier element 874 is stopped, and the active-type heat exchanger 87 has the same structure as that of the passive-type heat exchanger in appearance. Even in this case, heat absorption efficiency from the air inside the first closed structure including the structure not having the Peltier element is substantially equivalent to that of the structure having the Peltier element. Thus, the air inside the first closed structure can be appropriately cooled, and power saving of the projector 1 can be achieved.

Second Embodiment

A second embodiment according to the invention is now described with reference to the drawings.

Similar reference numbers are given to structures and parts similar to those in the first embodiment, and detailed explanation of those is not repeated or just briefly explained.

Figure 14:
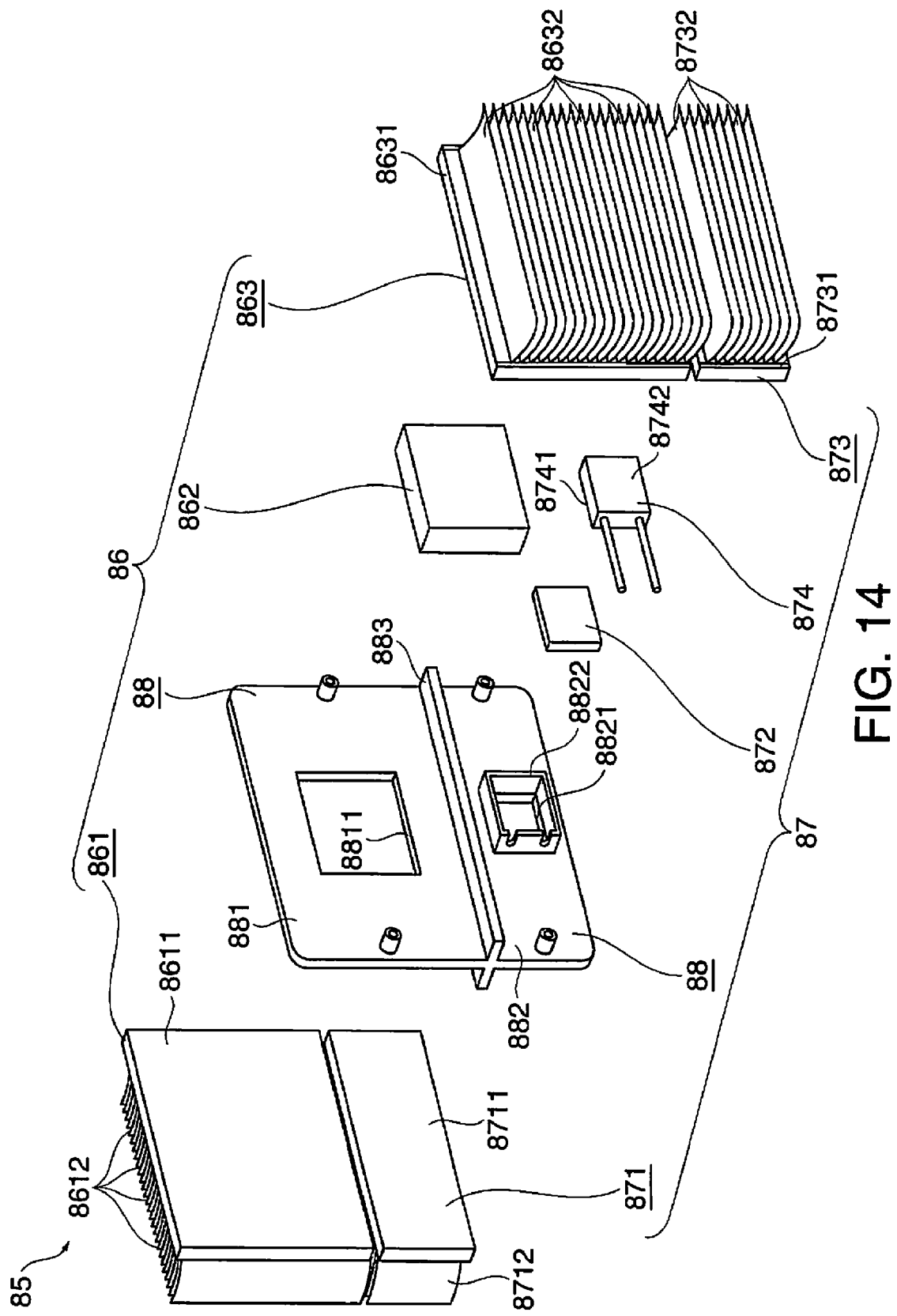
FIG. 14 is a perspective view illustrating a disassembled heat exchanger in a second embodiment.

FIG. 14 is a perspective view illustrating disassembled structure of the heat exchanger 85 in the second embodiment. More specifically, FIG. 14 illustrates the heat exchanger 85 as viewed from the back.

According to the first embodiment, the respective heat receiving side heat transfer members 861 and 871 have the same shape, and the respective heat releasing side heat transfer members 863 and 873 have the same shape in the passive-type heat exchanger 86 and the active-type heat exchanger 87. That is, the surface area for receiving heat of air flowing through the flow path C32, and the surface area for releasing heat to air flowing through the flow path C11 in the passive-type heat exchanger 86 are the same as those in the active-type heat exchanger 87.

In the second embodiment, however, the surface area for receiving heat of air flowing through the flow path C32, and the surface area for releasing heat to air flowing through the flow path C11 in the passive-type heat exchanger 86 are set different from that in the active-type heat exchanger 87.

More specifically, as illustrated in FIG. 14, the lengths of the heat receiving side heat transfer member 861, the first attachment part 881, and the heat releasing side heat transfer member 863 constituting the passive-type heat exchanger 86 are larger than those of the heat receiving side heat transfer member 871, the second attachment part 882, and the heat releasing side heat transfer member 873 constituting the active-type heat exchanger 87 in the vertical direction.

According to the second embodiment, the following advantages can be offered as well as those provided in the first embodiment.

In this embodiment, the surface areas of the heat receiving side heat transfer member 861 and the heat releasing side heat transfer member 863 of the passive-type heat exchanger 86 are larger than the corresponding surface areas of the active-type heat exchanger 87. In this case, high-temperature air warmed by the optical device 35 initially flows to the passive-type heat exchanger 86. Thus, heat can be effectively absorbed from the high-temperature air, and air flowing through the flow path C32 can be efficiently cooled step by step by the passive-type heat exchanger 86.

The invention is not limited to the embodiments described herein, and therefore includes modifications and improvements within the scope of the invention capable of providing advantages.

While the heat exchanger 85 is constituted by the passive-type heat exchanger 86 and the active-type heat exchanger 87 in the respective embodiments, other structure may be employed.

For example, the heat exchanger 85 may be constituted by three or more heat exchangers. In this case, it is preferable that the first heat exchanger on the upstream side of the flow path C32 is passive-type heat exchanger (not including Peltier element), and that the second and subsequent heat exchangers are active-type heat exchanger (including Peltier element) similarly to the embodiments described above.

While the passive-type heat exchanger 86 does not contain the Peltier element in the embodiments, the passive-type heat exchanger 86 may contain the Peltier element similarly to the active-type heat exchanger 87.

Also, while the active-type heat exchanger 87 contains the Peltier element 874 in the embodiments, the active-type heat exchanger 87 may eliminate the Peltier element similarly to the passive-type heat exchanger 86.

While the optical device 35 is disposed inside the first closed structure in the embodiments, the cooling target is not limited to the optical device 35 but may be other optical components.

While the light source device 31 is a discharge light emission type light source device in the embodiments, the light source device 31 may be constituted by laser diode, LED (light emitting diode), organic EL (electro luminescence) element, silicon light emission element, or other solid light emission elements.

While the projector 1 is a three-panel-type projector having the three liquid crystal panels 351, the projector may be a single-panel-type projector having one liquid crystal panel. Alternatively, the projector may have two liquid crystal panels, or four or more liquid crystal panels.

While the transmission-type liquid crystal panel having different light entrance surface and light exit surface is included in the embodiments, a reflection-type liquid crystal panel having the same light entrance surface and light exit surface may be used.

While the liquid crystal panel is included as the light modulation device in the embodiments, light modulation devices other than the liquid crystal panel such as device containing micromirror may be used.

While the example of front-type projector which projects in the direction of observing the screen has been discussed in the embodiments, the invention is applicable to a rear-type projector which projects images in the direction opposite to the direction of observing the screen.

The projector according to the invention which can secure stable quality of projection images and efficiently cool optical component is used for the purpose of presentation, home theater or the like.

The entire disclosure of Japanese Patent Application No. 2007-308976, filed Nov. 29, 2007 is expressly incorporated by reference herein.

What is claimed is:

1. A projector comprising:
an optical component
a closed structure having an annular air flow path through which air flows, the closed structure including
an optical component housing which accommodates the optical component and has an inlet port through which the air flows to an inside of the optical component housing and an outlet port through which air flows to an outside of the optical component housing,
a duct which introduces the air into the optical component housing via the inlet port, including reintroducing back into the inlet port the air previously flowed to the outside of the optical component housing via the outlet port, and
a plurality of heat exchangers each of which has a heat receiving side heat transfer member which faces an inside of the closed structure and receives heat from the air inside the closed structure, and a heat releasing side heat transfer member which faces an outside of the closed structure and connects with the heat receiving side heat transfer member such that the heat is transferable from the heat receiving side heat transfer member to the outside of the closed structure, and the plurality of heat exchangers are disposed along the annular air flow path through which the air flows from the inlet port to the inside of the optical component housing to the outside of the optical component housing via the outlet port and back again to the inlet port; and
a circulating fan which circulates the air through the annular air flow path.

2. The projector according to claim 1, wherein each of the plurality of heat exchangers are disposed close to one another.

3. The projector according to claim 1, wherein:
at least one of the plurality of heat exchangers includes a thermoelectric conversion element which has a heat absorbing surface connected with the heat receiving side heat transfer member and a heat releasing surface connected with the heat releasing side heat transfer member such that the heat is transferable from the heat receiving side heat transfer member to the heat releasing side heat transfer member.

4. The projector according to claim 3, further comprising:
a control device which supplies a power to the thermoelectric conversion element and controls an operation of the thermoelectric conversion element; and
an inside temperature detecting unit which detects an inside temperature of the closed structure, wherein
the control device stops the supply of power to the thermoelectric conversion element when the inside temperature detected by the inside temperature detecting unit is a predetermined first set temperature or lower.

5. The projector according to claim 3, further comprising:
a control device which supplies a power to the thermoelectric conversion element and controls an operation of the thermoelectric conversion element; and
an outside temperature detecting unit which detects an outside temperature of the closed structure, wherein
the control device stops the supply of power to the thermoelectric conversion element when the outside temperature detected by the outside temperature detecting unit is a predetermined second set temperature or lower.

6. The projector according to claim 1, wherein surface areas of the heat receiving side heat transfer member and the heat releasing side heat transfer member of one of the plurality of heat exchangers disposed on the annular air flow path are larger than surface areas of the heat receiving side heat transfer member and the heat releasing side heat transfer member of another of the plurality of heat exchangers disposed further downstream on the annular air flow path.

* * * * *